United States Patent [19]
Guenot

[11] 3,870,430
[45] Mar. 11, 1975

[54] ARRANGEMENT FOR THE DETECTION, WITH A ROCKING FEELER, OF THE PRESENCE OF A PART

[75] Inventor: Rene Guenot, Sceaux, France

[73] Assignee: Regie Nationale Des Usines Renault, Boulogne-Billancourt, France

[22] Filed: Feb. 25, 1974

[21] Appl. No.: 445,812

[30] Foreign Application Priority Data
Mar. 29, 1973 France .............................. 73.11404

[52] U.S. Cl. ........................................ 408/6, 83/62
[51] Int. Cl. ............................................ B23b 47/24
[58] Field of Search ................ 408/6, 11, 710, 711; 83/62

[56] References Cited
UNITED STATES PATENTS

| | | | |
|---|---|---|---|
| 1,935,979 | 11/1933 | Hubbard, Jr. ........................... | 408/6 |
| 2,677,168 | 5/1954 | Dewan ..................................... | 408/6 |
| 2,920,508 | 1/1960 | Wennerberg ........................... | 408/6 |
| 3,301,100 | 1/1967 | Hubeny .................................. | 408/6 |

Primary Examiner—Andrew R. Juhasz
Assistant Examiner—Leon Gilden
Attorney, Agent, or Firm—Oblon, Fisher, Spivak, McClelland & Maier

[57] ABSTRACT

An arrangement for the detection, with a rocking or pivotable feeler, of the presence of a part, in particular for checking the presence of tools of an automatic machine, characterized by the fact that the feeler is mounted so as to rock or pivot upon a carriage or slide provided with means to move the detection device along a path in which the feeler will contact the tool part, and along the reverse path to place the feeler in a position from the vicinity of the tool. The feeler encounters an unidirectional stop upon the carriage disposed in such a way that the feeler moves away from the stop upon contacting the tool part, and another fixed stop is also provided and located in the path of the feeler in such a way that the feeler passes such stop under normal conditions due to the pivoting or rocking thereof as the feeler contacts the tool part. A device for detecting when the feeler reaches the end of its path is also provided so as to initiate the movement of the feeler along the reverse path, and in the instance that the tool part is absent, the feeler will not pivot and thereby be immobilized between the two stops in a position prematurely arresting the apparatus along its path, thereby indicating the absence of the tool part.

8 Claims, 2 Drawing Figures

ARRANGEMENT FOR THE DETECTION, WITH A ROCKING FEELER, OF THE PRESENCE OF A PART

BACKGROUND OF THE INVENTION

1. Field of the Invention

The present invention relates generally to an arrangement or mechanism for the detection, with a rocking or pivotable feeler, of the presence of a tool part, and more particularly to tool detecting means which find significant application in the field of automatic machine tool checking apparatus and still more particularly to checking apparatus which may be utilized at different stages of automatic machining or assembly lines requiring several of such tool checking procedures.

2. Description of the Prior Art

In automatic machine tools for mass production, such as transfer machines or numerically controlled machines, a permanent arrangement to check the state of the tool is indispensable since, due to the high frequency of successive cycles of operation, the breakage or damage of a single tool associated with a given workpiece can, if not immediately detected, not only result in the deformity of a large number of workpieces but also risk damaging machining elements succeeding the defective element.

In addition to the factor of the high frequency of cycles of operation, access to the tools is often difficult and in addition, the continual spraying of cutting and lubricating oil during operation renders effective detection, by means of direct visual means, practically impossible and a safety hazard for operating personnel. Still further, it is unlikely that a person detecting breakage of a tool can react in sufficient time in order to stop the machine before the commencent of the next machining operation. Consequently, it is thus necessary to resort to a suitable mechanization.

Devices for detecting tool breakage are also known. These are, in most cases, located within a tool guide or placed in a housing integral with the guide support, the detection being effected in the retracted position of the tool and during the time between machining operations when the pieces being machined are being transferred. The result is a relatively cumbersome assembly permanently obstructing access to the tool and hindering both adjustment and replacement thereof. In effect, it is necessary, when replacing a tool, either to dismount or retract the detection device, or to retract, often manually, the device for driving the tool in its cutting path, beyond its normal retracted position.

Moreover, the presence of this detector near the tool does not permit very close spacing of the tool holders, and in addition, requires an increase in the tool overhang necessitating supplementary or larger guiding means for the tool, possibly leading to the use of a guide tube, whereby the tool does not obstruct the detecting means, or vice versa, for the sole purpose of mounting the detection device.

Among the known arrangements, several means of detection may be summarized as follows:

1. Mechanical arrangements consisting generally of a sliding catch stopped, under normal conditions, by means of the free end of the tool, and stopping the machine by some means in the absence of the tool.

2. Pneumatic devices based upon the obstruction of an air flow, under pressure, by means of the free end of the tool. The absence of the tool permits the pressurized air to act directly upon a device causing the machine to stop, or even to escape to atmosphere causing a fall in the pressure which acts upon a pressure capsule thus stopping the machine by intermediate means.

3. Optical arrangements in which the free end of the tool is normally interposed between a photoelectric cell and a point source of light. In the absence of the tool, the light is able to reach the photocell which, by some intermediate means, causes the machine to stop.

All these arrangements for detection have a common defect in that they can very easily be made inoperative by means of the presence of foreign bodies, such as for example, shavings or miscellaneous metallic debris entering into the guide tube or the detector housing. In addition, the photocell is a relatively expensive method and is rather vulnerably disposed within such an application, and the pneumatic technique necessitates the addition of a source of pressurized air which is relatively complex and simultaneously increases costs and the general complexity of the machine.

SUMMARY OF THE INVENTION

Accordingly, it is an object of the present invetion to provide an improved detection apparatus for the presence of machine tools.

Another object of the present invention is to provide an improved detection apparatus which does not obstruct access to the machining tool or tools.

Still another object of the present invention is to provide an improved detection apparatus which permits easy adjustment and replacement of the tools.

Yet another object of the present invention is to provide an improved detection apparatus which permits the mounting of a plurality of tools and also permits reduced spacing therebetween.

A further object of the present invention is to provide an improved detection apparatus which does not require an increased overhang of the tool which would normally lead to additional or larger guide means therefore.

A still further object of the present invention is to provide an improved detection apparatus which can be located above and be retracted with respect to the tool and thereby be effectively protected from shavings and other metallic debris generated during the machining operations.

A yet further object of the present invention is to provide an improved detection apparatus which is automatically and safely operated.

The foregoing and other objectives are achieved according to the present invention through the provision of a detection device which is mechanically simple and reliable and essentially includes a rocking or pivotable feeler which is mounted so as to rock or pivot upon a carriage or slide with means for driving the same along a detection path so as to bring the feeler into contact with the tool part, and along the reverse path so as to retract the feeler to a position which does not interfere with operation of the tool. The feeler has associated therewith a unidirectional mechanical stop mounted upon the carriage disposed so that the feeler can move away from the stop upon encountering the tool part, another stop being located along the detection path of the feeler and which the tool normally passes due to the rocking action under normal conditions when the feeler contacts the tool part, and a device for detecting when the feeler mechanism reaches the end of its path being provided to initiate the motion of the feeler along the reverse path. In the instance that the tool part be absent or damaged, the feeler is not rocked or pivoted and contacts, and is immobilized between, both of the stops whereupon the machine is prematurely arrested along the detection path so as to indicate the absence of the tool part.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF A PREFERRED EMBODIMENT

Figure 2:
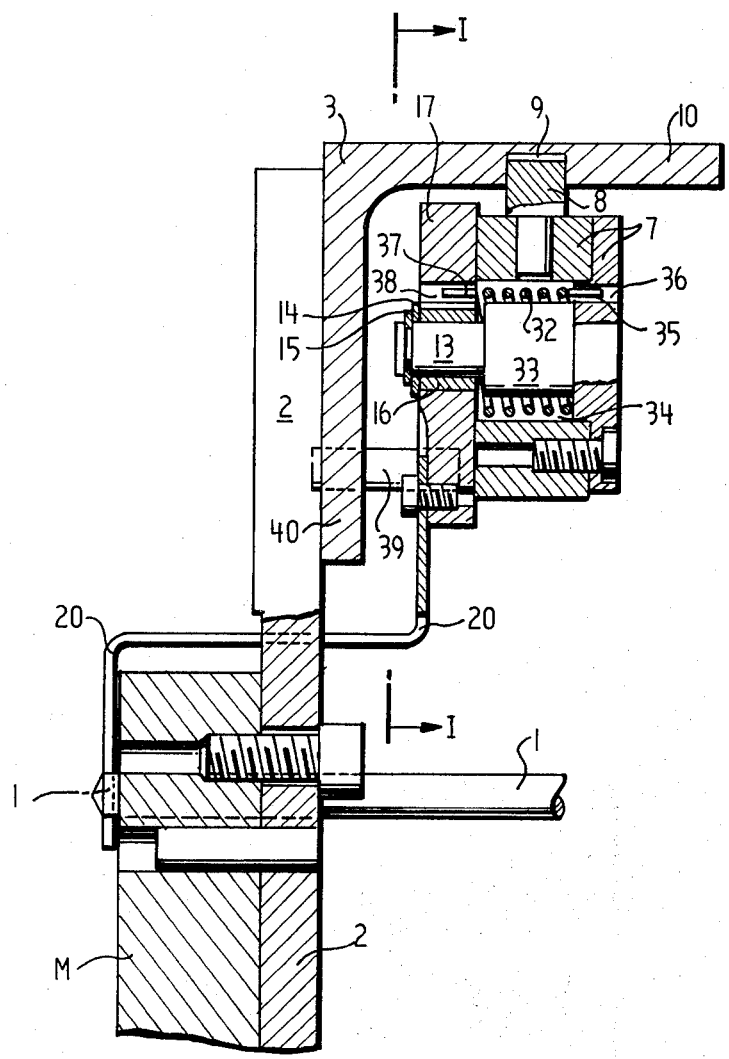
FIG. 2 is a cross-sectional view of the apparatus of FIG. 1 and taken along the line II—II of FIG. 1.

Referring now to the drawings, the device of the present invention is fastened to an element M of the machine frame, so as to extend generally in a direction perpendicular to the longitudinal axis of the tool 1 and is disposed above the tool and withdrawn with respect to the tool 1 when in its retracted position, as shown in FIG. 2, by means of a support plate 2 integrally welded with one of the two legs of an angle-iron 3. Within the interior angle of angle-iron 3 are located, in such a way as to be protected from shavings and various other metallic debris generated as a result of the machining operation, the elements of the detection device of the present invention which is to be described hereinafter. A second support plate 4 is similarly welded to the angle iron 3 within a plane extending perpendicular to that of support plate 2 and serves to hold a double-acting pneumatic cylinder 5 having rods upon each end of the actuated piston.

At the end of one rod 6, adjacent support plate 4, of the piston of mechanism 5 is a secured slide 7 guided, during the motion of the piston, by means of a guiding pin 8 which travels within a groove 9 provided within the upper side 10 of the angle-iron 3. A stop 11 is mounted within the upper side 10 of the angle-iron 3, its height being adjustable by means of a nut 12 which locks the same relative to the angle-iron 3. The slide 7 has an axle 13 upon which is pivotally mounted, in the manner shown in FIG. 2, utilizing a washer 14 and a retaining ring 15, a feeler able to pivot by means of a bushing 16. The feeler consists of a main body 17 capable of swiveling about axle 13 and of a form generally resembling that of a parallelepiped but having a bevel 18 cut upon its top surface and another bevel 19 cut upon its lower side face for purposes to be explained more in detail hereinafter. At the base of this body 17 of the feeler there is also fastened, by means of a screw, a metal rod 20 having a Z-shaped configuration, as best shown in FIG. 2, such that it can come into contact with the free end of the tool 1 in its retracted position for a purpose which will be more apparent hereinafter.

At the end of the cylinder 5 opposite the end supported by means of plate 4 there is fastened another angle-iron 21 serving as means for attaching a switch 22 which serves a dual function. Also at this end of pneumatic cylinder 5 there is additionally provided a slidable piston rod 23 having at its free end a device intended to interact with a roller 24 which serves to operate switch 22. This device comprises two stops 25 and 26 for limiting and controlling the extent and direction of travel of piston rod 23 one of which, that is stop 25, is threadably engaged upon a threaded portion 27 of the end of piston rod 23 and is locked thereupon by means of nut 28, while the other stop 26 is similarly locked upon the threaded portion 31, which is integral with stop 25, by means of nuts 29 and 30. In this manner, one can adjust the position of the test stops 25 and 26 with respect to one another as well as with respect to the piston.

Figure 1:
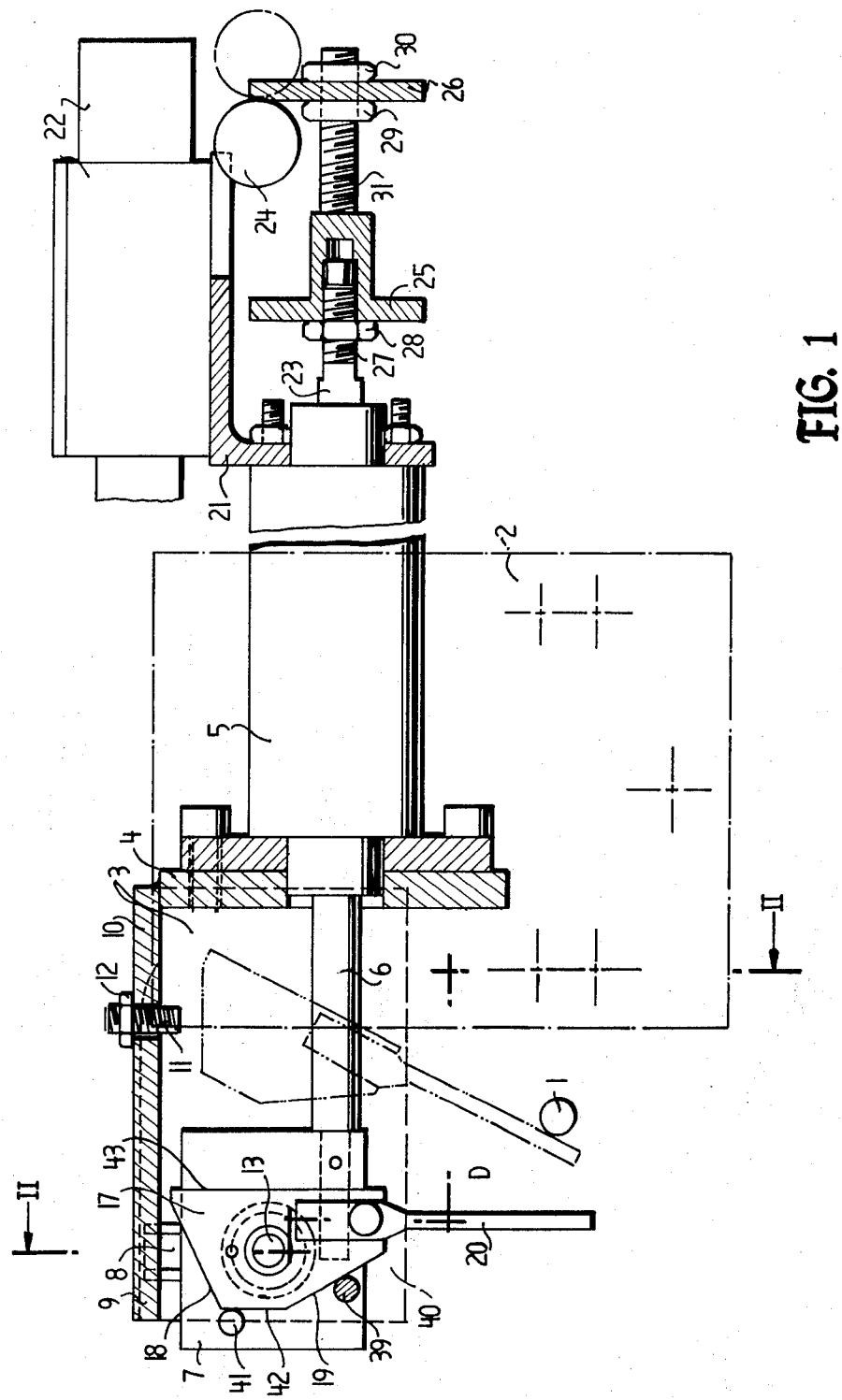
FIG. 1 is an elevation view, partly in cross-section, of the arrangement or mechanism constructed according to the present invention and showing its cooperative parts and taken along line I—I of FIG. 2.

In operation, the tool 1 being brought at the end of its machining operation, to its retracted position defined by the Figures, and the feeler 17 being in the out-of-the-way or withdrawn position shown by the solid lines in FIG. 1, cylinder 5 is actuated so that the lower end of the metal rod 20 of the feeler 17, which is displaced with the piston of cylinder 5 in the direction of arrow D, comes into contact with the free end of the tool 1. The presence of the tool holds back the lower end of the metal rod 20 while the slide 7 driven by means of the piston rod 6 continues in its path which causes a pivoting motion of the feeler assembly about the axle 13 in the clockwise direction. As a result of this pivoting motion, the bevel 18 of the upper surface of the body 17 of the feeler assumes a position which is substantially parallel with the upper side 10 of the angle-iron 3, as indicated in broken lines in FIG. 1, thus allowing body 17 to pass the stop 11 and thereby permit the assembly to continue to the end of its path. At the end of the piston travel, the test stop 25 actuates the roller 24 of switch 22 from its solid line position to the broken line position and thereby initiating, by intermediate means, the reversal of the piston travel.

Upon the return path, the feeler, in order to resume its function at the end of the following machining operation, is returned to its initial position, by means of a helically wound torsional spring 32 which is coiled about the bearing surface 33 of axle 13, as seen in FIG. 2, as soon as contact is lost between the lower end of the metal rod 20 and the free end of tool 1 when the cylinder mechanism is moved toward the left as seen in FIG. 1. Spring 32 is mounted within a recess 34 provided within slide 7, and is anchored at one end 35 within an aperture 36 provided with slide 7 and at the other end 37 within another aperture 38 provided within the body 17 of the feeler.

In case of failure of the helical spring 32, either due to breakage or jamming caused by the presence of a foreign body within its housing 34 or interposed between the slide 7 and the body 17 of the feeler, an auxiliary safety device is intended to return the feeler to its initial vertical position. This device utilizes two stops, one of which, at 39 is integral with the forward side 40 of the angle-iron 3, while the other one 41 is integral with slide 7. These stops are positioned in such a manner that at the end of the retraction of the piston, the bevelled face 19 of the feeler body 17 comes into contact with stop 39, the length and slope of such components being appropriately formed for performance of this operation, which causes a sliding movement of the bevelled face 19 upon or along the stop 39 and a pivoting movement of the feeler about the axle 13 in the counterclockwise direction and in such a manner that contact between the side 42, of body 17 adjacent to the bevelled face 19, and stop 41, blocks and stops further pivoting of the feeler which has then reached its initial vertical position. Thus, by the combined action of the stops 39 and 41, the feeler is returned in a positive manner to its initial position during the period wherein a machining operation is occuring.

Moreover, at the end of the retraction of the piston, the test stop 26 actuates the roller 24 of switch 22 thereby returning it to its initial position and permitting the initiation, through intermediate means, of the succeeding machining cycle, the checking of the presence of the tool rendering a positive result.

In this instance of a machine with several tools mounted thereon, this initiation will depend upon the switches of all the devices of this type being suitably actuated, the switches of course being connected in series within the circuit initiating the succeeding cycle. It will also be noted that the stop 41 constitutes a unidirectional type stop for the body 17 of the feeler, and further use of such mechanism will be made as will be seen hereinafter.

In the instance that the end of the tool 1 is absent, such as for example, due to breakage, wear, or the like, the lower end of the metal rod 20 of the feeler will not be immobilized during the motion of the piston in the direction of the arrow D and the feeler remains in its initial vertical position due to the action of the helical spring 32. The upper end of the side 43 of body 17 then encounters the stop 11, and since the stop 41 prevents the counterclockwise pivoting of the feeler, the body 17 of the feeler is immobilized between the stops 11 and 41, thus prematurely halting the motion of the piston in comparison with the motion of such piston when the entire mechanism is operative as when the tool 1 is present.

To continue, the motion is interrupted here in such a manner that the roller 24 of switch 22 finds itself immobilized in a neutral intermediate position between its position shown in broken lines corresponding to the command for retraction of the piston, and that shown by solid lines corresponding to that of the return to the position permitting the start of the succeeding machining cycle. For this reason, the succeeding cycle is not in fact initiated and this state of the switch or the detecting device itself can be utilized to activate a signaling device for indicating that the tool is recognized to be defective.

Such a mechanism for detecting, and eventually the localization of the tool breakage, is applicable, among others, to tools for example, for drilling, tapping, boring, punching, chamfering or the like, mounted upon single or multi-spindle elements of transfer machines or numerically controlled machines. In particular, it is possible to align several pivotable feelers in a row upon the same piston rod, each feeler having associative stops corresponding to stops 11 and 39 disposed upon the same angle-iron 3 and a stop corresponding to stop 41 located upon a common slide 7, the angle-iron 3 and the slide 7 being of the proper length and supported at their ends opposite to pneumatic cylinder 5 so as to compensate for their overhang, as well as to provide guidance for slide 7. This arrangement permits simultaneous checking for the presence, or the state or condition, of several tools by means of the same device for control and detection, the breakage, damage, wear or absence of a single tool blocking the motion of the ensemble and thus stopping the logical sequence of the operative cycle of the machine.

Obviously, many modifications and variations of the present invention are possible in light of the above teachings without departing in any way from the domain of the invention, notably in regard to the control devices actuated by the arrangement. Thus, for example, a simple switch sensitive to the detection of the tool part could be carried by means of the slide and actuated at the end of the rocking motion of the feeler so as to initiate retraction, while another simple switch indicating the absence of the tool could be located so as to be actuated by the feeler when it is in contact with the stop 11. It is to be understood therefore, that within the scope of the appended claims, the present invention may be practiced otherwise than as specifically described herein.

WHAT IS CLAIMED AS NEW AND DESIRED TO BE SECURED BY LETTERS PATENT OF THE UNITED STATES IS:

1. An arrangement for the detection of the presence of a part, such as for example, the tool of an automatic machine, comprising;

a framework;

a carriage movably supported upon said framework;

a feeler pivotably mounted upon said carriage and including means for contacting said tool part for pivoting said feeler;

means for driving said carriage and said feeler in a predetermined cyclical path so as to perform a detection operation;

a fixed stop means mounted upon said framework and disposed within said path whereupon said feeler detecting the presence of and contacting said tool part, said feeler will pivot so as to pass said fixed stop means and permit said carriage and said feeler to complete a first movement phase of said detection operation thereby indicating the presence of said part;

a unidirectional stop means fixedly mounted upon said carriage in abutting relationship with said feeler when said feeler is not pivoted and for cooperating with said fixed stop means so as to retain said feeler therebetween and prematurely arrest the movement of said carriage and said feeler when said feeler is not pivoted due to the absence of said tool part so as to thereby indicate the absence of said part; and means for detecting the completion of said first phase of movement of said detection operation and for initiating a second movement phase of said operation for returning said feeler and said carriage to their initial positions.

2. An arrangement for detection as set forth in claim 1, wherein said feeler is returned to its non-pivoted position in abutting relationship with said unidirectional stop means by means of a spring.

3. An arrangement for detection as set forth in claim 1 wherein a second fixed stop means is provided upon said framework for contacting a bevelled face portion of said feeler so as to return said feeler to its initial position of contact with said unidirectional stop means.

4. An arrangement for detection as set forth in claim 1 wherein said feeler includes a bevelled surface interposed between those faces interacting with said unidirectional stop means and said fixed stop means, so disposed and configured as to facilitate passage of said feeler beyond said fixed stop means when said tool part is present and said feeler has been pivoted.

5. An arrangement for detection as set forth in claim 1, wherein said carriage and said feeler are disposed above and withdrawn from said tool and within a plane extending substantially perpendicular to the axis of said tool.

6. An arrangement for detection as set forth in claim 1 wherein said arrangement further comprises signal means actuated at said position of arrest for indicating the absence of said part.

7. An arrangement for detection as set forth in claim 1 wherein:

said framework includes an angle-iron having means for guiding said carriage along with said predetermined path; and said carriage, feeler, and all of said stop means are disposed within an interior portion of said angle-iron so as to be protected from flying shavings and various metallic debris generated from the machining operation.

8. An arrangement for detection as set forth in claim 1, wherein a plurality of feelers are aligned upon said carriage, each of said feelers having respectively associated therewith fixed stop means disposed upon a single support member of said framework and a unidirectional stop means disposed upon said carriage;

whereby the simultaneous checking for the presence or the condition of a plurality of tools in conjunction with said driving and detection means, is facilitated.

* * * * *